J. H. NOLAN.
Velocipede.
No. 100,316.  Patented March 1, 1870.
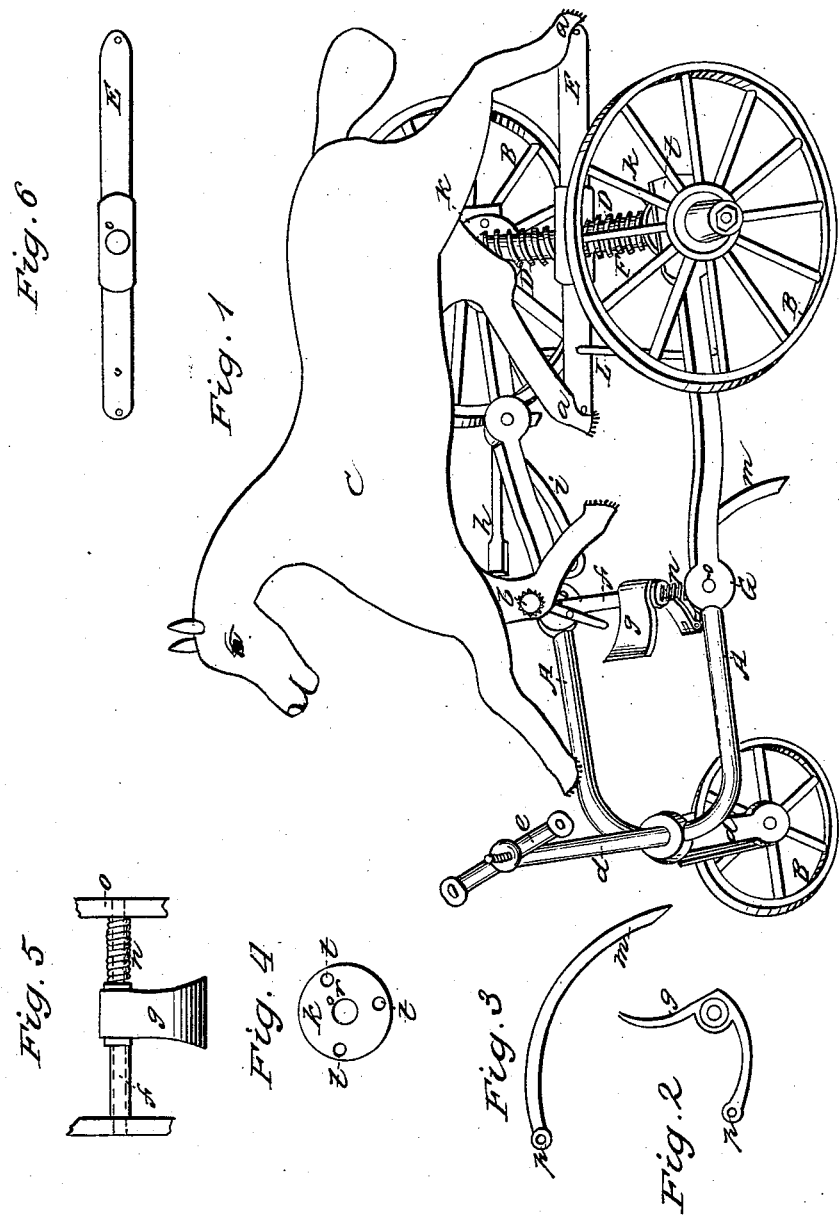
Witnesses:
E. A. Palmer
Henry Walsh
Inventor:
John H. Nolan

United States Patent Office.

JOHN H. NOLAN, OF WATERVILLE, NEW YORK.

Letters Patent No. 100,316, dated March 1, 1870; antedated February 11, 1870.

IMPROVEMENT IN CHILDREN'S HORSE AND SELF-PROPELLER.

The Schedule referred to in these Letters Patent and making part of the same.

*To all whom it may concern:*

Be it known that I, JOHN H. NOLAN, of Waterville, in the county of Oneida, and State of New York, have invented a new and improved Children's Hobby-Horse or Self-Propeller; and I do hereby declare that the following is a full and exact description thereof, reference being had to the accompanying drawings and the letters of reference marked thereon.

Figure 1 is a perspective view, showing use of the children's hobby-horse or self-propeller.

Figure 2 is the elbow, as seen in fig. 1, at $g$, and Figure 5, and kept in position by the spring $n$, one end being attached to the elbow $g$, and the other end to the frame, as seen in fig. 5, at $o$.

Figures 2 and 3 are connected together at $p\,p$, forming a loose joint, allowing the pawl to move up and down.

F, fig. 1, is the axle, around which are two coil springs D D, right and left hand.

One end of each spring is attached to the bar E, which turns on the axle.

The outer ends of the springs are fastened to the collar $k$, Figure 4, as seen at $r$, which are made to turn on the axle for the purpose of straining or relaxing the springs, according to the weight of the rider, a hole in the frame to match one of the three holes in the collar $l\,l\,l$, for a pin to keep the collars in their position.

The hind feet of the horse are fastened to the ends of the bar E, and through the knee of one of the front legs the rod $c$ passes up into the body, which may be taken up and let out and held in its place by the screw $b$.

$d$ is the upright shaft, with straps down on both sides of the front wheel B, to hold the wheel.

The shaft above the wheel passes through the front end of the frame A A to turn the wheel in any direction, by means of a bar, $e$, across the top of the shaft $d$, with holes in each end to guide the wheel by the rider.

$h$ is the brake.

$i$, the spring, to hold the brake from the wheel when not wanted.

L is a rod or spring through the front end of the bar extending each way down under the frame, to prevent the spring from raising the fore part of the horse too high.

To operate the children's hobby-horse or self-propeller, the rider sits in position on the horse. A forward and backward motion of the body oscillates the bar E and moves the rod $c$ up and down onto the face of the elbow $g$, giving a backward and forward movement of the lower end of the pawl $m$ upon the surface occupied by the wheels, thus moving the hobby-horse along at the will of the rider.

What I claim, and desire to secure by Letters Patent, is—

In combination with the frame, consisting of its several parts, as described, the bar F, with the right-and-left coiled springs D D, the collars R R, the bar $f$ with the spring $n$, the elbow $g$, lever $m$, and rod $c$, all arranged as herein set forth.

JOHN H. NOLAN.

Witnesses:
 E. A. PALMER,
 HENRY WALSH.